(12) United States Patent
Chen et al.

(10) Patent No.: US 9,866,641 B2
(45) Date of Patent: Jan. 9, 2018

(54) INFORMATION QUERY METHOD AND DEVICE

(71) Applicant: Huawei Device (Dongguan) Co., Ltd., Dongguan (CN)

(72) Inventors: Ji Chen, Shenzhen (CN); Ping Fang, Shenzhen (CN); Zhiming Ding, Shenzhen (CN); Zhenguo Du, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 0 days.

(21) Appl. No.: 14/900,141

(22) PCT Filed: Jun. 19, 2013

(86) PCT No.: PCT/CN2013/077485
§ 371 (c)(1),
(2) Date: Jul. 1, 2016

(87) PCT Pub. No.: WO2014/201641
PCT Pub. Date: Dec. 24, 2014

(65) Prior Publication Data
US 2017/0006115 A1    Jan. 5, 2017

(51) Int. Cl.
*H04L 29/08* (2006.01)
*G06F 13/14* (2006.01)
(Continued)

(52) U.S. Cl.
CPC ............. *H04L 67/16* (2013.01); *G06F 13/14* (2013.01); *H04W 8/005* (2013.01); *H04W 84/12* (2013.01); *Y02B 60/1228* (2013.01)

(58) Field of Classification Search
CPC .......... G06F 13/14; H04L 67/16; H04L 12/18; H04L 12/24; H04W 84/12; H04W 8/005
See application file for complete search history.

(56) References Cited

U.S. PATENT DOCUMENTS 6,192,404 B1 * 2/2001 Hurst .................... H04L 45/00
370/238
8,312,114 B2   11/2012 Edmonds
(Continued)

FOREIGN PATENT DOCUMENTS

CN      1924839 A       3/2007
CN    101047664 A     10/2007
(Continued)

*Primary Examiner* — Mohamed Kamara
(74) *Attorney, Agent, or Firm* — Slater Matsil, LLP

(57) ABSTRACT

Embodiments of the present invention provide an information query method and device, which can reduce a waste of resources in an information query process, and decrease power consumption. The method includes: sending, by a requesting device in a broadcast manner, a first query request message, where the first query request message carries a first query condition and information about a group identity; and when the requesting device receives a first query response message sent by a responding device that meets the first query condition, sending, by the requesting device, a second query request message that uses the group identity as a receiving address, so that the responding device processes the second query request message.

12 Claims, 5 Drawing Sheets

(51) Int. Cl.
*H04W 8/00* (2009.01)
*H04W 84/12* (2009.01)

(56) References Cited

U.S. PATENT DOCUMENTS

| | | | | |
|---|---|---|---|---|
| 9,467,445 | B2* | 10/2016 | Egan | H04L 63/20 |
| 2002/0155845 | A1* | 10/2002 | Martorana | H04W 4/02 |
| | | | | 455/456.1 |
| 2007/0083679 | A1 | 4/2007 | Kikuchi | |
| 2007/0202865 | A1* | 8/2007 | Moride | H04W 88/06 |
| | | | | 455/419 |
| 2013/0132995 | A1 | 5/2013 | Tu et al. | |
| 2013/0259042 | A1* | 10/2013 | Song | H04L 45/16 |
| | | | | 370/390 |
| 2014/0040383 | A1* | 2/2014 | Dura | G06F 9/543 |
| | | | | 709/206 |

FOREIGN PATENT DOCUMENTS

| | | |
|---|---|---|
| CN | 101681241 A | 3/2010 |
| CN | 102318318 A | 1/2012 |
| CN | 102523098 A | 6/2012 |
| CN | 102780568 A | 11/2012 |
| WO | WO2013004051 * | 1/2013 |

\* cited by examiner

INFORMATION QUERY METHOD AND DEVICE

This application is a national stage entry of International Application No. PCT/CN2013/077485 filed on Jun. 19, 2013, which is hereby incorporated by reference in its entirety.

TECHNICAL FIELD

The present invention relates the field of communications, and in particular, to an information query method and device.

BACKGROUND

A wireless fidelity (WiFi) technology, which is typically referred to as a wireless local area network (WLAN), finds wide use in a variety of industries due to its advantages such as rapid to deploy, convenient to use, and high transmission rate. Access points of WiFi networks are found available in so many places, such as hotels, cafes, schools, and hospitals, that WiFi is made easy almost everywhere you are.

Herein, a service refers to a function provided by a device, for example, a printing service provided by a printer device, a scanning service provided by a scanner, and a service of cash deposit and withdrawal provided by an ATM. In real-world circumstances, a user may request these devices from different operators or individuals who operate these devices, or a user at home may want to directly connect to and use these devices. In both cases, these services need to be discovered first. Service information is a description about a service, and the service information may include information such as a name, a category, a characteristic, a price, and a site of the service. When a device needs to announce its service, the device may send out service information, so that another device that receives the service information is able to know the service this device is capable of providing.

On a WLAN, a service may be directly provided by an access point (AP) or a station (STA), which means that this AP or STA is a special device, for example, the AP or STA is a printer or a copier; alternatively, a service may also be indirectly provided by the AP or the STA, to be specific, the AP or the STA records service information of a service providing device, such as a printer or a copier, connected to the AP or the STA.

In the prior art, to discover or request a service on a WLAN, a requesting device sends a broadcast query frame to devices on the entire WLAN, to inquire which device can provide the requested service, for example, to inquire which device is a printer. Afterwards, a device that receives the query frame and is capable of providing the requested service replies to the requesting device in a unicast manner, whereas a device incapable of providing the requested service does not respond. After receiving the reply from the device capable of providing the requested service, the requesting device needs to inquire about some detailed service information. For example, the requesting device may inquire a printer whether the printer is a 3D printer, where the printer is located, and price of the printing, and the like. The requesting device may send a query frame for further service information by means of broadcasting, to query the service information of the service providing device.

When the service information is queried in the broadcast manner, each receiving device on the WLAN needs to receive and interpret the broadcast frame. In which case, each device needs to completely parse the broadcast frame, and then discard the broadcast frame if finding out that the broadcast frame does not belong to the device. This leads to a waste of resources and increases power consumption for the entire network.

SUMMARY

Embodiments of the present invention provide an information query method and device, which can reduce a waste of resources in an information query process, and decrease power consumption.

According to a first aspect, an information query method is provided, including: receiving, by a responding device, a first query request message sent in a broadcast manner by a requesting device, where the first query request message carries a first query condition and information about a group identity; when the responding device meets the first query condition, obtaining and recording, by the responding device, the group identity according to the first query request message, and sending a first query response message to the requesting device; and receiving, by the responding device, a second query request message sent by the requesting device, and when a receiving address of the second query request message is the group identity, parsing content of the second query request message, so as to process the second query request message.

With reference to the first aspect, in a first implementation of the first aspect, the information about the group identity includes the group identity, and the obtaining and recording, by the responding device, the group identity according to the first query request message includes: directly obtaining, by the responding device, the group identity from the first query request message and recording the group identity.

With reference to the first aspect and the foregoing implementation of the first aspect, in a second implementation of the first aspect, the information about the group identity includes group identity indication information, the group identity indication information is used to indicate a predetermined rule used for obtaining the group identity, and the obtaining and recording, by the responding device, the group identity according to the first query request message includes: obtaining, by the responding device, the group identity according to the predetermined rule and recording the group identity.

With reference to the first aspect and the foregoing implementations of the first aspect, in a third implementation of the first aspect, the first query request message further includes an address of the requesting device, and the obtaining, by the responding device, the group identity according to the predetermined rule and recording the group identity includes: modifying a unicast-indicative characteristic bit value of the address of the requesting device to a multicast-indicative characteristic bit value, to obtain the group identity; or performing a hash operation according to the address of the requesting device, to obtain the group identity.

With reference to the first aspect and the foregoing implementations of the first aspect, in a fourth implementation of the first aspect, the first query response message is used to indicate to the requesting device that the responding device meets the first query condition.

With reference to the first aspect and the foregoing implementations of the first aspect, in a fifth implementation of the first aspect, the second query request message includes: a message header that carries the group identity and the address of the requesting device; and a message body that carries a second query condition, where the second query condition is different from the first query condition.

With reference to the first aspect and the foregoing implementation manners of the first aspect, in a sixth implementation manner of the first aspect, the first query request message further includes delete indication information used to instruct the responding device and the requesting device to delete the group identity.

According to a second aspect, an information query method is provided, including: sending, by a requesting device in a broadcast manner, a first query request message, where the first query request message carries a first query condition and information about a group identity; and when the requesting device receives a first query response message sent by a responding device that meets the first query condition, sending, by the requesting device, a second query request message that uses the group identity as a receiving address, so that the responding device processes the second query request message.

With reference to the second aspect, in a first implementation of the second aspect, the information about the group identity includes the group identity, so that the responding device directly obtains the group identity from the first query request message and records the group identity.

With reference to the second aspect and the foregoing implementation of the second aspect, in a second implementation of the second aspect, the information about the group identity includes group identity indication information, so that the responding device obtains the group identity according to a predetermined rule indicated by the group identity indication information and records the group identity.

With reference to the second aspect and the foregoing implementations of the second aspect, in a third implementation of the second aspect, the first query request message further includes an address of the requesting device, and the predetermined rule includes: modifying a unicast-indicative characteristic bit value of the address of the requesting device to a multicast-indicative characteristic bit value, to obtain the group identity; or performing a hash operation according to the address of the requesting device, to obtain the group identity.

With reference to the second aspect and the foregoing implementations of the second aspect, in a fourth implementation of the second aspect, the second query request message includes: a message header that carries the group identity and the address of the requesting device; and a message body that carries a second query condition, where the second query condition is different from the first query condition.

With reference to the second aspect and the foregoing implementations of the second aspect, in a fifth implementation of the second aspect, the first query request message further includes delete indication information used to instruct the responding device and the requesting device to delete the group identity.

According to a third aspect, an information query device is provided, including: a first receiving unit, configured to receive a first query request message sent in a broadcast manner by a requesting device, where the first query request message carries a first query condition and information about a group identity; an obtaining unit, configured to: when the responding device meets the first query condition, obtain and record the group identity according to the first query request message received by the first receiving unit; and a second receiving unit, configured to receive a second query request message sent by the requesting device, and when a receiving address of the second query request message is the group identity, parse content of the second query request message, so as to process the second query request message.

With reference to the third aspect, in a first implementation of the third aspect, the information about the group identity includes the group identity, and the obtaining unit is specifically configured to: directly obtain the group identity from the first query request message received by the first receiving unit and record the group identity.

With reference to the third aspect and the foregoing implementation of the third aspect, in a second implementation of the third aspect, the information about the group identity includes group identity indication information, the group identity indication information is used to indicate a predetermined rule used for obtaining the group identity, and the obtaining unit is specifically configured to: obtain the group identity according to the predetermined rule and record the group identity.

With reference to the third aspect and the foregoing implementations of the third aspect, in a third implementation of the third aspect, the first query request message further includes an address of the requesting device, and the obtaining unit is specifically configured to: modify a unicast-indicative characteristic bit value of the address of the requesting device to a multicast-indicative characteristic bit value, to obtain the group identity; or perform a hash operation according to the address of the requesting device, to obtain the group identity.

With reference to the third aspect and the foregoing implementations of the third aspect, in a fourth implementation of the third aspect, the first query response message received by the receiving unit is used to indicate to the requesting device that the responding device meets the first query condition.

With reference to the third aspect and the foregoing implementations of the third aspect, in a fifth implementation of the third aspect, the second query request message received by the second receiving unit includes: a message header that carries the group identity and the address of the requesting device; and a message body that carries a second query condition, where the second query condition is different from the first query condition.

With reference to the third aspect and the foregoing implementations of the third aspect, in a sixth implementation of the third aspect, the first query request message received by the first receiving unit further includes delete indication information used to instruct the responding device and the requesting device to delete the group identity.

According to a fourth aspect, an information query device is provided, including: a first sending unit, configured to send a first query request message in a broadcast manner, where the first query request message carries a first query condition and information about a group identity; a receiving unit, configured to receive a first query response message sent by a responding device that meets the first query condition; and a second sending unit, configured to send a second query request message that uses the group identity as a receiving address, so that the responding device processes the second query request message.

With reference to the fourth aspect, in a first implementation of the fourth aspect, the information about the group identity includes the group identity, so that the responding device directly obtains the group identity from the first query request message sent by the first sending unit and records the group identity.

With reference to the fourth aspect and the foregoing implementation of the fourth aspect, in a second implementation of the fourth aspect, the information about the group identity includes group identity indication information, so that the responding device obtains the group identity according to a predetermined rule indicated by the group identity indication information and records the group identity.

With reference to the fourth aspect and the foregoing implementations of the fourth aspect, in a third implementation of the fourth aspect, the first query request message sent by the first sending unit further includes an address of the requesting device, and the predetermined rule includes: modifying a unicast-indicative characteristic bit value of the address of the requesting device to a multicast-indicative characteristic bit value, to obtain the group identity; or performing a hash operation according to the address of the requesting device, to obtain the group identity.

With reference to the fourth aspect and the foregoing implementations of the fourth aspect, in a fourth implementation of the fourth aspect, the second query request message sent by the second sending unit includes: a message header that carries the group identity and the address of the requesting device; and a message body that carries a second query condition, where the second query condition is different from the first query condition.

With reference to the fourth aspect and the foregoing implementations of the fourth aspect, in a fifth implementation of the fourth aspect, the first query request message sent by the first sending unit further includes delete indication information used to instruct the responding device and the requesting device to delete the group identity.

According to a fifth aspect, an information query device is provided, including: a receiving circuit, configured to receive a first query request message sent in a broadcast manner by a requesting device, where the first query request message carries a first query condition and information about a group identity; and a processor, configured to: when the responding device meets the first query condition, obtain and record the group identity according to the first query request message received by the receiving circuit, where the receiving circuit is further configured to receive a second query request message that is sent by the requesting device and uses the group identity as a receiving address; and the processor is further configured to: when the receiving address of the second query request message is the group identity, parse content of the second query request message.

With reference to the fifth aspect, in a first implementation of the fifth aspect, the device further includes a memory, the information about the group identity includes the group identity, and the processor is specifically configured to: when the responding device meets the first query condition, directly obtain the group identity from the first query request message received by the receiving circuit and record the group identity in the memory.

With reference to the fifth aspect and the foregoing implementation of the fifth aspect, in a second implementation of the fifth aspect, the device further includes a memory, the information about the group identity includes group identity indication information, and the processor is specifically configured to: obtain the group identity according to a predetermined rule indicated by the group identity indication information and record the group identity into the memory.

With reference to the fifth aspect and the foregoing implementations of the fifth aspect, in a third implementation of the fifth aspect, the first query request message further includes an address of the requesting device, and the processor is specifically configured to: modify a unicast-indicative characteristic bit value of the address of the requesting device to a multicast-indicative characteristic bit value, to obtain the group identity; or perform a hash operation according to the address of the requesting device, to obtain the group identity.

With reference to the fifth aspect and the foregoing implementations of the fifth aspect, in a fourth implementation of the fifth aspect, the first query response message received by the receiving circuit is used to indicate to the requesting device that the responding device meets the first query condition.

With reference to the fifth aspect and the foregoing implementations of the fifth aspect, in a fifth implementation of the fifth aspect, the second query request message received by the receiving circuit includes: a message header that carries the group identity and the address of the requesting device; and a message body that carries a second query condition, where the second query condition is different from the first query condition.

With reference to the fifth aspect and the foregoing implementations of the fifth aspect, in a sixth implementation of the fifth aspect, the first query request message received by the receiving circuit further includes delete indication information used to instruct the responding device and the requesting device to delete the group identity.

According to a sixth aspect, an information query device is provided, including: a transmitting circuit, configured to send a first query request message in a broadcast manner, where the first query request message carries a first query condition and information about a group identity; a receiving circuit, configured to receive a first query response message sent by the responding device that meets the first query condition; and a processor, configured to: when the receiving circuit receives the first query response message, control the transmitting circuit to send a second query request message that uses the group identity as a receiving address.

With reference to the sixth aspect, in a first implementation of the sixth aspect, the information about the group identity includes the group identity, so that the responding device directly obtains the group identity from the first query request message sent by the transmitting circuit and records the group identity.

With reference to the sixth aspect and the foregoing implementation of the sixth aspect, in a second implementation of the sixth aspect, the information about the group identity includes group identity indication information, so that the group responding device obtains the group identity according to a predetermined rule indicated by the identity indication information and records the group identity.

With reference to the sixth aspect and the foregoing implementations of the sixth aspect, in a third implementation of the sixth aspect, the first query request message sent by the transmitting circuit further includes an address of the requesting device, and the predetermined rule includes: modifying a unicast-indicative characteristic bit value of the address of the requesting device to a multicast-indicative characteristic bit value, to obtain the group identity; or performing a hash operation according to the address of the requesting device, to obtain the group identity.

With reference to the sixth aspect and the foregoing implementations of the sixth aspect, in a fourth implementation of the sixth aspect, the second query request message sent by the transmitting circuit includes: a message header that carries the group identity and the address of the requesting device; and a message body that carries a second query condition, where the second query condition is different from the first query condition.

With reference to the sixth aspect and the foregoing implementations of the sixth aspect, in a fifth implementation of the sixth aspect, the first query request message sent by the transmitting circuit further includes delete indication information used to instruct the responding device and the requesting device to delete the group identity.

In embodiments of the present invention, a responding device that meets a query condition obtains and records a group identity according to a first query request message sent by a requesting device, so as to receive a second query request message that uses the group identity as a receiving address, which can thereby reduce a waste of resources in the information query process, and decrease power consumption.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (GSM), a Code Division Multiple Access (CDMA) system, a Wideband Code Division Multiple Access (WCDMA), a general packet radio service (GPRS) system, a Wireless Fidelity (WiFi) system, and a Long Term Evolution (LTE), which is not limited in the present invention.

A requesting device and a responding device may be a user equipment (UE) in a mobile communications network, may be a base station (BTS, Base Transceiver Station) in the GSM or CDMA, may be a base station (NodeB) in the WCDMA, may be an evolved NodeB (eNB, or e-NodeB) in the LTE, may be a work station, router, or server in a LAN, which is not limited in the present invention, and may further be an AP or STA in a WLAN, which is not limited in the present invention.

In the following description, it should be understood that parsing content of a message does not include parsing receiver indication information (for example, address information) in the message. From the perspective of a physical layer, after a physical signal (an electric signal, an optical signal, a radio frequency signal, or the like) that carries a message is sent from one network node, other nodes on the network may all receive the signal. Generally speaking, a network protocol requires a node that receives the message to parse receiver indication information in the message, such as address information and a scrambling code. Such parsing is not covered in the message content parsing described in the present invention.

For convenience of description, a wireless local area network (WLAN), that is, WiFi is preferably used as an example to describe the technical solutions of the present invention.

Figure 1:
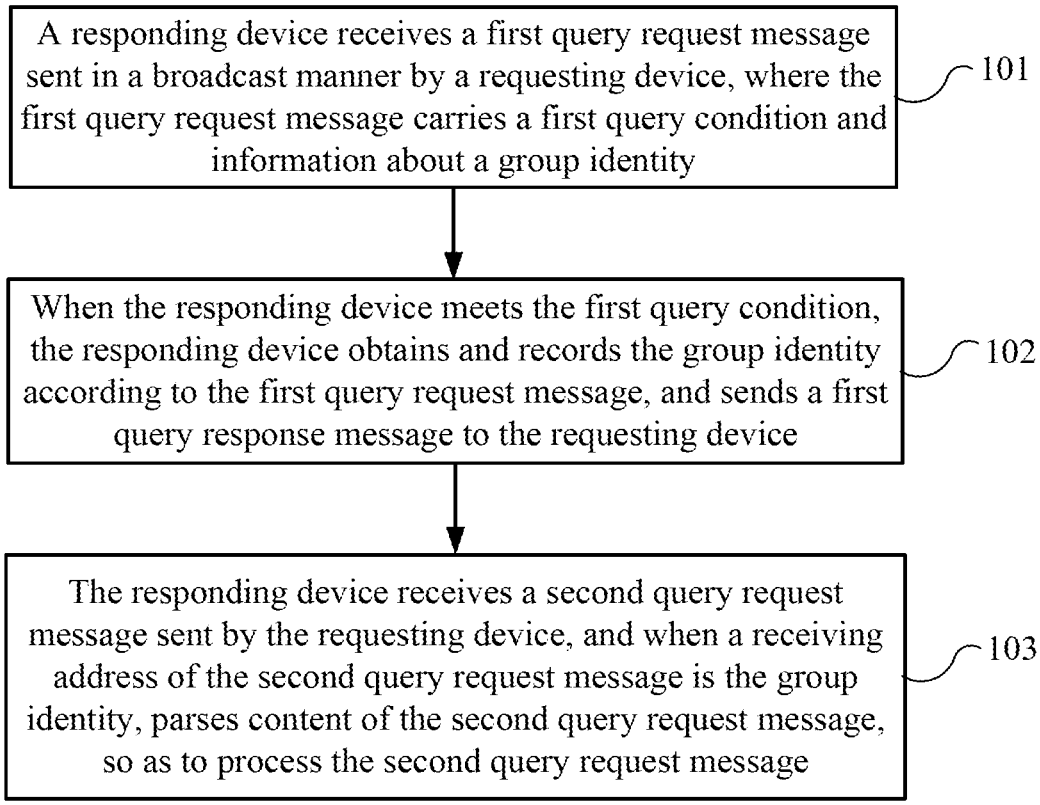
FIG. 1 is a flowchart of an information query method according to an embodiment of the present invention.

FIG. 1 is a flowchart of an information query method according to an embodiment of the present invention. The method in FIG. 1 is executed by a responding device.

101: A responding device receives a first query request message sent in a broadcast manner by a requesting device, where the first query request message carries a first query condition and information about a group identity.

102: When the responding device meets the first query condition, the responding device obtains and records the group identity according to the first query request message, and sends a first query response message to the requesting device.

103: The responding device receives a second query request message sent by the requesting device, and when a receiving address of the second query request message is the group identity, parses content of the second query request message, so as to process the second query request message.

In this embodiment of the present invention, a responding device that meets a query condition obtains and records a group identity according to a first query request message sent by a requesting device, so as to receive a second query request message that uses the group identity as a receiving address, which can thereby reduce a waste of resources in the information query process, and decrease power consumption.

Optionally, as an embodiment, the first query request message in step 101 may include: a message header that carries a receiving address and a source address, where the receiving address is a broadcast address, and the source address is an address of the requesting device; and a message body that carries the first query condition, so that the responding device determines, according to the message body, whether the responding device meets the query condition. The first query request message further includes the information about the group identity, which is used to indicate the group identity, where the information about the group identity may be located in the message body, or may be located in the message header. It should be noted that, the message in this embodiment of the present invention may refer to a MAC-layer frame on a WiFi network, or may refer to a packet on a data network. Accordingly, the message header and the message body may refer to a frame header and a frame body respectively, or may refer to a packet header and a packet body respectively.

Optionally, as another embodiment, in step 102, the information about the group identity includes the group identity. The step in which the responding device obtains and records the group identity according to the first query request message includes: the responding device directly obtains the group identity from the first query request message and records the group identity. Specifically, when the first query request message explicitly carries the group identity, the responding device may directly obtain the group identity from the message body. Explicitly carrying the group identity means adding an information element in the message body to carry the group identity.

Optionally, as another embodiment, in step 102, the information about the group identity includes group identity indication information, and the group identity indication information is used to indicate a predetermined rule for obtaining the group identity. The step in which the responding device obtains and records the group identity according to the first query request message includes: the responding device obtains the group identity according to the predetermined rule and records the group identity. Specifically, when the first query request message implicitly carries the group identity, the responding device may modify a unicast-indicative characteristic bit value of the address of the requesting device to a multicast-indicative characteristic bit value, to obtain the group identity; or perform a hash operation according to the address of the requesting device, to obtain the group identity. The hash operation herein may be capturing a particular quantity of bits such as 48 bits after performing a widely used hash function operation (where the widely used hash functions include MD5, SHA1, SHA256, SHA512, and the like), or may be a simple conversion that is otherwise defined, for example, inverting bits one by one. For whichever algorithm, a final result needs to ensure that the multicast-indicative characteristic bit value can indicate the address value is a multicast address, and the address value is not a broadcast address (FF-FF-FF-FF-FF-FF). Herein, the group identity indication information may be indication information that is carried in the message body to indicate which predetermined rule is used, or may be indication information used to trigger a predetermined rule. The indication information used to trigger a predetermined rule may be one bit in the message body, or may be frame type indication information in the message header indicating that a particular type of frames triggers the predetermined rule. The foregoing predetermined rule may be preset locally in a device by using a communications protocol, so that the requesting device and the responding device can convert the source address into the group identity according to the preset predetermined rule.

Optionally, as another embodiment, the first query response message in step 103 is used to indicate to the requesting device that the responding device meets the query condition, and to trigger the requesting device to send the second query request message.

Optionally, as another embodiment, in step 103, the second query request message includes: a message header that carries the group identity and the address of the requesting device; and a message body that carries a second query condition, where the second query condition is different from the first query condition.

Specifically, the message header of the second query request message directly carries the group identity, namely, the multicast address. After receiving the second query request message, a device on the network only needs to parse the message header to determine whether the message is sent to the device, namely, to determine whether the device belongs to a group with the group identifier by checking whether a group identity the same as the group identity in the message header is stored locally. If the device belongs to the group, the device continues to parse content of the message body; or if the device does not belong to the group, the device need not continue to accept and parse the message.

It should be noted that, one first query request message may be followed by multiple second query request messages. The second query condition may be different from the first query condition, may be a further query condition compared with the first query condition, and may also be a query for detailed information.

Optionally, as another embodiment, the first query request message further includes delete indication information used to instruct the responding device and the requesting device to delete the group identity.

In this embodiment of the present invention, a responding device that meets a query condition obtains and records a group identity according to a first query request message sent by a requesting device, so that the responding device can selectively receive and parse second query request messages, which can thereby reduce a waste of resources in the information query process, and decrease power consumption. In addition, compared with the practice of sending the second query request message in a unicast manner, this embodiment of the present invention exhibits time saving and higher efficiency.

Figure 2:
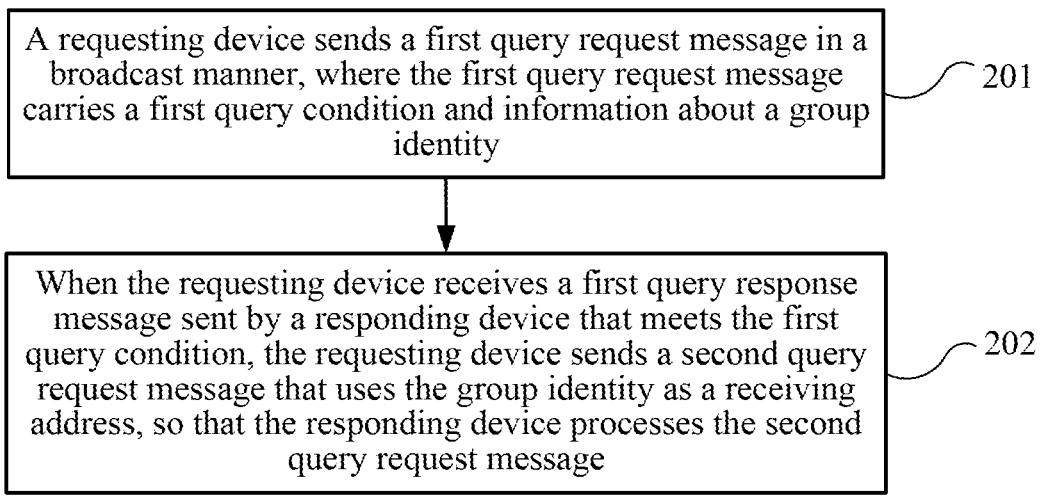
FIG. 2 is a flowchart of an information query method according to an embodiment of the present invention.

FIG. 2 is a flowchart of an information query method according to an embodiment of the present invention. The method in FIG. 2 is executed by a requesting device.

201: A requesting device sends a first query request message in a broadcast manner, where the first query request message carries a first query condition and information about a group identity.

202: When the requesting device receives a first query response message sent by a responding device that meets the first query condition, the requesting device sends a second query request message that uses the group identity as a receiving address, so that the responding device processes the second query request message.

In this embodiment of the present invention, a responding device that meets a query condition obtains and records a group identity according to a first query request message sent by a requesting device, so as to receive a second query request message that uses the group identity as a receiving address, which can thereby reduce a waste of resources in the information query process, and decrease power consumption.

Optionally, as an embodiment, the first query request message in step 201 may include: a message header that carries a receiving address and a source address, where the receiving address is a broadcast address, and the source address is an address of the requesting device; and a message body that carries the first query condition, so that the responding device determines, according to the message body, whether the responding device meets the query condition. The first query request message further includes the information about the group identity, which is used to indicate the group identity, where the information about the group identity may be located in the message body, or may be located in the message header. It should be noted that, the message in this embodiment of the present invention may refer to a MAC-layer frame on a WiFi network, or may refer to a packet on a data network. Accordingly, the message header and the message body may refer to a frame header and a frame body respectively, or may refer to a packet header and a packet body respectively.

Optionally, as an embodiment, in step 201, the information about the group identity includes the group identity, so that the responding device directly obtains the group identity from the first query request message and records the group identity. Specifically, when the first query request message explicitly carries the group identity, the responding device may directly obtain the group identity from the message body. Explicitly carrying the group identity means adding an information element in the message body to carry the group identity.

Optionally, as another embodiment, in step 201, the information about the group identity includes group identity indication information, so that the responding device obtains the group identity according to a predetermined rule indicated by the group identity indication information and records the group identity. Specifically, when the first query request message implicitly carries the group identity, the responding device may modify a unicast-indicative characteristic bit value of the address of the requesting device to a multicast-indicative characteristic bit value, to obtain the group identity; or perform a hash operation according to the address of the requesting device, to obtain the group identity. The hash operation herein may be capturing a particular quantity of bits such as 48 bits after performing a widely used hash function operation (where the widely used hash functions include MD5, SHA1, SHA256, SHA512, and the like), or may be a simple conversion that is otherwise defined, for example, inverting bits one by one. For whichever algorithm, a final result needs to ensure that the multicast-indicative characteristic bit value can indicate the address value is a multicast address, and the address value is not a broadcast address (FF-FF-FF-FF-FF-FF). Herein, the group identity indication information may be indication information that is carried in the message body to indicate which predetermined rule is used, or may be indication information used to trigger a predetermined rule. The indication information used to trigger a predetermined rule may be one bit in the message body, or may be frame type indication information in the message header indicating that a particular type of frames triggers the predetermined rule. The foregoing predetermined rule may be preset locally in a device by using a communications protocol, so that the requesting device and the responding device can convert the source address into the group identity according to the preset predetermined rule.

Optionally, as another embodiment, the first query response message in step 202 is used to indicate to the requesting device that the responding device meets the query condition, and to trigger the requesting device to send the second query request message.

Optionally, as another embodiment, in step 202, the second query request message includes: a message header that carries the group identity and the address of the requesting device; and a message body that carries a second query condition, where the second query condition is different from the first query condition.

Specifically, the message header of the second query request message directly carries the group identity, namely, the multicast address. After receiving the second query request message, a device on the network only needs to parse the message header to determine whether the message is sent to the device, namely, to determine whether the device belongs to a group with the group identifier by checking whether a group identity the same as the group identity in the message header is stored locally. If the device belongs to the group, the device continues to parse content of the message body; or if the device does not belong to the group, the device need not continue to accept and parse the message.

It should be noted that, one first query request message may be followed by multiple second query request messages. The second query condition may be different from the first query condition, may be a further query condition compared with the first query condition, and may also be a query for detailed information. The second query request message may be sent immediately after the requesting device receives the first query response message, and may also be sent a period of time after the requesting device receives the first query response message.

Optionally, as another embodiment, the first query request message further includes delete indication information used to instruct the responding device and the requesting device to delete the group identity.

In this embodiment of the present invention, a responding device that meets a query condition obtains and records a group identity according to a first query request message sent by a requesting device, so that the responding device can selectively receive and parse second query request messages, which can thereby reduce a waste of resources in the information query process, and decrease power consumption. In addition, compared with the practice of sending the second query request message in a unicast manner, this embodiment of the present invention exhibits time saving and higher efficiency.

Figure 3:
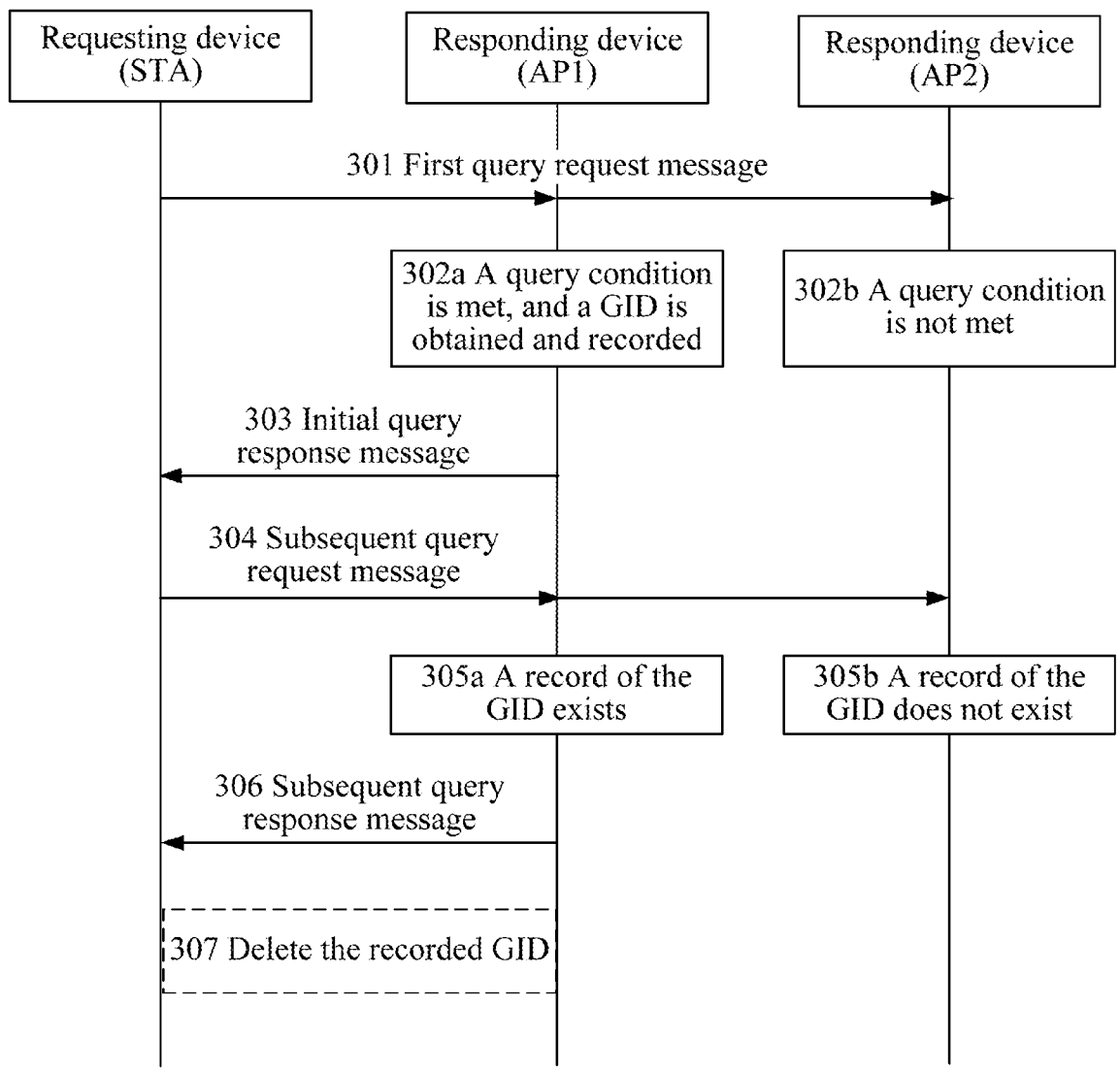
FIG. 3 is a diagram depicting information query interaction according to an embodiment of the present invention.

FIG. 3 is a diagram depicting information query interaction according to an embodiment of the present invention.

In this embodiment of the present invention, description is made by using a service information query on a WLAN as an example, where a service may be provided by an AP or STA, and a device that initiates the service information query may also be an AP or STA. In this embodiment of the present invention, the device that initiates the service information query is referred to as a requesting device, and other devices on the network are categorized as responding devices. Such categorization is merely logical categorization for ease of understanding; a requesting device in a current service information query process may also be a requesting device in another service information query process.

For convenience of description, an STA is used as an example of the requesting device, and an AP is used as an example of the responding device. A person skilled in the art may understand that, it may also be that the requesting device is an AP and the responding device is an STA, or both the requesting device and the responding device are STAs, or both the requesting device and the responding device are APs, which is not limited in this embodiment of the present invention.

301: A first query request message.

When a need arises to query information or a service, the requesting device needs to determine the first query request message, and broadcast this request message to discover a device, on the network, that is capable of providing the information or the service. The first query request message needs to carry a first query condition and information about a group identity (Group Identity, GID). The first query condition is used to indicate the information or a service to be queried, and the GID may be explicitly or implicitly carried as the information about the GID.

Specifically, if the information about the GID is the GID, the GID is explicitly carried, for example, an information element (Information Element, IE for short) may be added, which may be referred to as GID_IE, to record the GID, and the GID_IE is carried in a message body of the first query request message.

If the information about the GID is GID indication information used to indicate how to generate the GID, the GID is implicitly carried. The GID indication information may be a flag used to indicate which predetermined rule is used to generate the GID, where the predetermined rule may be preset locally in the device by using a communications protocol. For example, one predetermined rule is to modify a unicast-indicative characteristic bit value in a MAC address of the STA to a multicast-indicative characteristic bit value; another predetermined rule is to generate the GID by modifying one bit or multiple bits in the MAC address of the STA; and still another predetermined rule is to perform a hash operation on the MAC address of the STA to generate a hash value having a particular quantity of bits (for example, 32 bits), and to combine the value with a value (for example, 16 bits) generated by the STA randomly or according to a particular rule to produce a 48-bit GID. The foregoing several predetermined rules for generating the GID are only several optimal embodiments, and there are many other methods for generating the GID. The present invention is not limited thereto. It may be defined in a protocol that one identification code is assigned to each of the foregoing multiple methods. The identifier code may be used as the GID indication information to indicate which method is used to generate the GID. For example, 01 indicates that the GID is generated by modifying a unicast-indicative characteristic bit value to a multicast-indicative characteristic bit value, and 10 indicates that the GID is generated by performing a hash operation on the MAC address of the STA.

In addition, as a more preferred embodiment, it may be defined in a protocol that one of the foregoing methods is preset on the requesting device and the responding device. The GID indication information is only used to indicate that the GID can be generated by in accordance with the protocol, that is, the GID indication information is used to indicate that communication is performed in a multicast manner.

If the foregoing method in which the GID is implicitly carried is used, because the GID may be directly derived from the MAC address of the STA, it may be defined in a protocol that a same predetermined rule is preset on both devices. An indication bit in the first query request message may be used to indicate the use of the predetermined rule, or frame type indication information in a frame header directly indicates the use of the predetermined rule so that particular frames trigger the use of the predetermined rule; a receiving party can calculate the GID by using the STA address in a message header.

For a specific example, when the STA wants to query a printing service, the STA generates an initial query request frame (namely, the first query request message), which may specifically be a probe request frame, and apparently in actual use cases, may be a frame of another type, which is not limited by the present invention. A receiving address and a source address in the frame header are determined, where the receiving address is a broadcast address used to indicate that this frame is a broadcast frame, for example, all bits are 1; and the source address is a MAC address of the requesting device STA. A frame body may include a query condition used to indicate the printing service, for example, a predefined service type code 001 used to indicate the printing service. If the GID is explicitly carried, the frame body may further carry the GID_IE. If the GID is implicitly carried, the frame body may further carry a flag or identification information used to indicate a predetermined rule for generating the GID.

302a: A query condition is met.

After receiving the first query request message, a responding device 1 (AP1) parses the message, and determines, according to the query condition carried in the message, whether the responding device 1 meets the query condition. For example, as described in step 301, the query condition is the service type code 001 for indicating the printing service. In this case, the AP1 compares a local service type code with the service type code in the query condition.

The AP1 meets the query condition, and therefore, the AP1 further obtains the GID according to the first query request message. Corresponding to the foregoing step 301, if the GID is explicitly carried, the AP1 may directly obtain the GID according to the GID_IE in the message body of the first query request message. If the GID is implicitly carried, the AP1 may determine, according to the flag or the identification information that is carried in the message body to indicate a predetermined rule for generating the GID, the predetermined rule for generating the GID, and then determine the GID based on the MAC address of the STA in the message header and the predetermined ruler. Alternatively, a same predetermined rule has been preset on the two devices to maintain protocol compliance, and the AP1 may determine the GID based on the MAC address of the STA in the message header and the predetermined rule defined in the protocol.

After obtaining the GID, the AP1 may locally record the GID. Specifically, the AP1 may store the GID by using a storage device such as a buffer or a magnetic disc, which is not limited by this embodiment of the present invention.

302b: The query condition is not met.

After receiving the first query request message, a responding device 2 (AP2) parses the message, and determines, according to the query condition carried in the message, whether the responding device 2 meets the query condition. If it is determined that the AP2 does not meet the query condition, the AP2 does not obtain the GID, does not record the GID, and does not send a reply message to the STA. It should be understood that, when it is determined that the query condition is not met, the AP may also obtain and record the GID, and add a screening flag for the GID. The present invention does not limit the processing performed when the query condition is not met.

303: A first query response message.

The AP that is found in the foregoing step 302a to have met the query condition sends the first query response message the STA, to inform the STA that the AP is capable of providing the requested service. Specifically, the first query response message may be a probe response frame, and in actual use cases, may also be another frame, which is not limited by the present invention.

In addition, it should be noted that, the step of sending the first query response message may be performed before or after the step of obtaining and recording the GID in the foregoing step 302a, or the two steps are performed at the same time, which is not limited by the present invention.

304: A second query request message.

After receiving the first query response message, the STA further sends a subsequent query message, namely, the second query request message, to the AP that is capable of providing the requested service, to inquire detailed service information of the AP. Returning to the example of printing service, the STA may continue to inquire whether the printing service is 3D printing, a printing price, a location of the AP, and the like.

A message header of the second query request message carries the GID determined in the foregoing step 301, in other words, a receiving address in the message header is the GID, namely, a multicast address; and a source address may still be the MAC address of the STA. In this case, a message body is used to carry specific service information that needs to be queried. It is within the scope of the prior art to specify the way in which the message body carries specific service information that needs to be queried, and details are not described again herein. Specifically, the second query request message may be a GAS initial request frame, and in actual use cases, may also be another frame, which is not limited by the present invention.

It should be noted that, in an actual use process, after performing one initial query process, the STA that initiates the query may perform one or more subsequent query processes. For example, the STA may first ask whether there is a printer nearby (by sending the first query request message), then ask about price of the printing (by sending the second query request message for the first time), then ask about a location of the printer (by sending the second query request message for the second time), and so on. However, no matter how many subsequent queries there are, all the queries are performed based on the query condition in the first query request message. For example, in the foregoing example, all the queries are performed based on the printer. However, if the STA that initiates the query further wants to query a new service, for example, if the STA further wants to query a scanner, the STA needs to initiate a new initial query. Further, if the STA that initiates the query wants to query multiple services at the same time in one first query request message, content of the multiple services may all be conveyed in the first query request message. Other APs may separately reply with a first query response message for each respective service, and similarly, in a subsequent query, information about multiple services may also be queried in one second query request message.

305*a*: A record of the GID exists.

After receiving the second query request message, the AP1 parses the message header of the message, to obtain the receiving address, namely, the GID. If a record of a GID that is the same as the GID is stored locally, the AP1 continues to obtain and parse the message body, to determine which specific service information needs to be queried.

305*b*: A record of the GID does not exist.

After receiving the second query request message, the AP2 parses the message header of the message, and does not further process the message any more if no same GID has been recorded locally.

Specifically, the AP or the STA determine whether it belongs to a group identified by the GID. If the AP or the STA has received an initial query and has recorded the GID, it is considered that the AP or the STA has joined the group identified by the GID, and needs to receive and interpret a subsequent frame that uses the GID as a destination. If the AP or the STA has not joined the group identified by the GID, the AP or the STA does not need to receive or interpret the frame.

306: A second query response message.

After determining which specific service information needs to be queried, the AP in the foregoing step 305*a* writes the requested service information into the second query response message and sends the message to the STA. Specifically, the specific service information may be carried in a GAS initial response, and in actual use cases, may also be another frame, which is not limited by the present invention. In addition, corresponding to the multiple subsequent query processes in the foregoing step 304, the second query response message may be sent for multiple times.

307: The recorded GID is deleted.

After a given period of time, the GID recorded by the AP and the STA may be deleted, to prevent unnecessary data from being accumulated over the given period of time. For example, after the given period of time elapses, the STA that initiates the query no longer performs a further query, or the STA has left this area and therefore no longer needs to perform a query. This given period of time may be defined in a standard as 5 seconds or 10 seconds or the like, and this period of time may also be specified in the first query request message, for example, by adding a time value to the first query request message. This step is an optional step.

In this embodiment of the present invention, a responding device that meets a query condition obtains and records a group identity according to a first query request message sent by a requesting device, so that the responding device can selectively receive and parse second query request messages, which can thereby reduce a waste of resources in the information query process, and decrease power consumption. In addition, compared with the practice of sending the second query request message in a unicast manner, this embodiment of the present invention exhibits time saving and higher efficiency.

Figure 4:
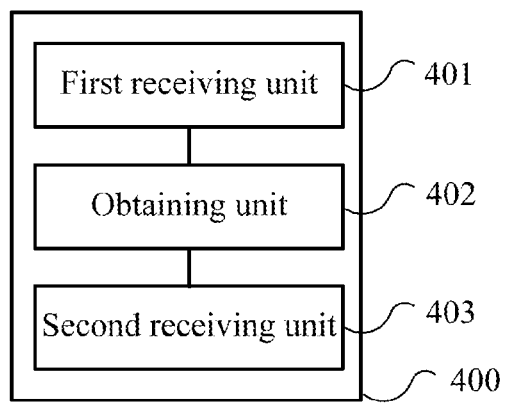
FIG. 4 is a schematic block diagram of a responding device according to an embodiment of the present invention.

FIG. 4 is a schematic block diagram of a responding device according to an embodiment of the present invention. The responding device 400 in FIG. 4 includes a first receiving unit 401, an obtaining unit 402, and a second receiving unit 403.

The first receiving unit 401 is configured to receive a first query request message sent in a broadcast manner by a requesting device, where the first query request message carries a first query condition and information about a group identity; the obtaining unit 402 is configured to: when the responding device 400 meets the first query condition, obtain and record the group identity according to the first query request message received by the first receiving unit 401; and the second receiving unit 403 is configured to receive a second query request message sent by the requesting device, and when a receiving address of the second query request message is the group identity, parse content of the second query request message, so as to process the second query request message.

In this embodiment of the present invention, a responding device 400 that meets a query condition obtains and records a group identity according to a first query request message sent by a requesting device, so as to receive a second query request message that uses the group identity as a receiving address, which can thereby reduce a waste of resources in the information query process, and decrease power consumption.

Optionally, as an embodiment, the first query request message received by the first receiving unit 401 may include: a message header that carries a receiving address and a source address, where the receiving address is a broadcast address, and the source address is an address of the requesting device; and a message body that carries the first query condition, so that the responding device 400 determines, according to the message body, whether the responding device 400 meets the query condition. The first query request message further includes the information about the group identity, which is used to indicate the group identity, where the information about the group identity may be located in the message body, or may be located in the message header. It should be noted that, the message in this embodiment of the present invention may refer to a MAC-layer frame on a WiFi network, or may refer to a packet on a data network. Accordingly, the message header and the message body may refer to a frame header and a frame body respectively, or may refer to a packet header and a packet body respectively.

Optionally, as another embodiment, the information about the group identity may include the group identity, and the obtaining unit 402 is specifically configured to: directly obtain the group identity from the first query request message received by the first receiving unit 401 and record the group identity. Specifically, when the first query request message explicitly carries the group identity, the responding device 400 may directly obtain the group identity from the message body. Explicitly carrying the group identity means adding an information element in the message body to carry the group identity.

Optionally, as another embodiment, the information about the group identity may include group identity indication information, and the obtaining unit 402 is specifically configured to: obtain the group identity according to a predetermined rule and record the group identity. Specifically, when the first query request message implicitly carries the group identity, the obtaining unit 402 of the responding device 400 may modify a unicast-indicative characteristic bit value of the address of the requesting device to a multicast-indicative characteristic bit value, to obtain the group identity; or perform a hash operation according to the address of the requesting device, to obtain the group identity. The hash operation herein may be capturing a particular quantity of bits such as 48 bits after performing a widely used hash function operation (where the widely used hash functions include MD5, SHA1, SHA256, SHA512, and the like), or may be a simple conversion that is otherwise defined, for example, inverting bits one by one. For whichever algorithm, a final result needs to ensure that the multicast-indicative characteristic bit value can indicate the address value is a multicast address, and the address value is not a broadcast address (FF-FF-FF-FF-FF-FF). Herein, the group identity indication information may be indication information that is carried in the message body to indicate which predetermined rule is used, or may be indication information used to trigger a predetermined rule. The indication information used to trigger a predetermined rule may be one bit in the message body, or may be frame type indication information in the message header indicating that a particular type of frames triggers the predetermined rule. The foregoing predetermined rule may be preset locally in a device by using a communications protocol, so that the requesting device and the responding device 400 can convert the source address into the group identity according to the preset predetermined rule.

Optionally, as another embodiment, the first query response message is used to indicate to the requesting device that the responding device 400 meets the query condition, and to trigger the requesting device to send the second query request message.

Optionally, as another embodiment, the second query request message received by the second receiving unit 403 includes: a message header that carries the group identity and the address of the requesting device; and a message body that carries a second query condition, where the second query condition is different from the first query condition.

In other words, the message header of the second query request message directly carries the group identity, namely, the multicast address. After receiving the second query request message, a device on the network only needs to parse the message header to determine whether the message is sent to the device, namely, to determine whether the device belongs to a group with the group identifier by checking whether a group identity the same as the group identity in the message header is stored locally. If the device belongs to the group, the device continues to parse content of the message body; or, if the device does not belong to the group, the device need not continue to accept and parse the message.

It should be noted that, one first query request message may be followed by multiple second query request messages. The second query condition may be different from the first query condition, may be a further specific query condition compared with the first query condition, and may also be a query for detailed information.

Optionally, as another embodiment, the first query request message further includes delete indication information used to instruct the responding device 400 and the requesting device to delete the group identity.

In this embodiment of the present invention, a responding device 400 that meets a query condition obtains and records a group identity according to a first query request message sent by a requesting device, so that the responding device 400 can selectively receive and parse second query request messages, which can thereby reduce a waste of resources in the information query process, and decrease power consumption. In addition, compared with the practice of sending the second query request message in a unicast manner, this embodiment of the present invention exhibits time saving and higher efficiency.

Figure 5:
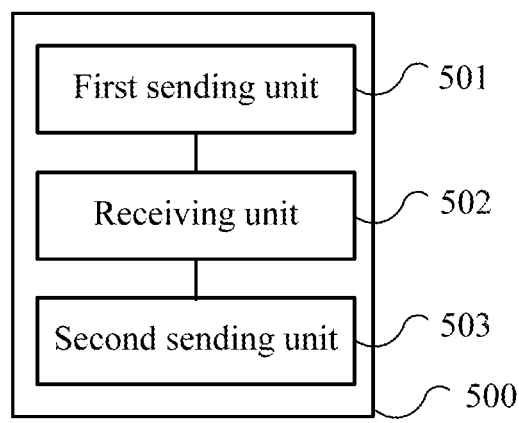
FIG. 5 is a schematic block diagram of a requesting device according to an embodiment of the present invention.

FIG. 5 is a schematic block diagram of a requesting device according to an embodiment of the present invention. The requesting device 500 in FIG. 5 includes a first sending unit 501, a receiving unit 502, and a second sending unit 503.

The first sending unit 501 sends a first query request message in a broadcast manner, where the first query request message carries a first query condition and information about a group identity; the receiving unit 502 receives a first query response message sent by a responding device that meets the first query condition; and the second sending unit 503 sends a second query request message that uses the group identity as a receiving address, so that the responding device processes the second query request message.

In this embodiment of the present invention, a responding device that meets a query condition obtains and records a group identity according to a first query request message sent by a requesting device 500, so as to receive a second query request message that uses the group identity as a receiving address, which can thereby reduce a waste of resources in the information query process, and decrease power consumption.

Optionally, as an embodiment, the first query request message sent by the first sending unit 501 may include: a message header that carries a receiving address and a source address, where the receiving address is a broadcast address, and the source address is an address of the requesting device 500; and a message body that carries the first query condition, so that the responding device determines, according to the message body, whether the responding device meets the query condition. The first query request message further includes the information about the group identity, which is used to indicate the group identity, where the information about the group identity may be located in the message body, or may be located in the message header. It should be noted that, the message in this embodiment of the present invention may refer to a MAC-layer frame on a WiFi network, or may refer to a packet on a data network. Accordingly, the message header and the message body may refer to a frame header and a frame body respectively, or may refer to a packet header and a packet body respectively.

Optionally, as an embodiment, the information about the group identity includes the group identity, so that the responding device directly obtains the group identity from the first query request message and records the group identity. Specifically, when the first query request message explicitly carries the group identity, the responding device may directly obtain the group identity from the message body. Explicitly carrying the group identity means adding an information element in the message body to carry the group identity.

Optionally, as another embodiment, the information about the group identity includes group identity indication information, so that the responding device obtains the group identity according to a predetermined rule and record the group identity. Specifically, when the first query request message implicitly carries the group identity, the responding device may modify a unicast-indicative characteristic bit value of the address of the requesting device 500 to a multicast-indicative characteristic bit value, to obtain the group identity; or perform a hash operation according to the address of the requesting device 500, to obtain the group identity. The hash operation herein may be capturing a particular quantity of bits such as 48 bits after performing a widely used hash function operation (where the widely used hash functions include MD5, SHA1, SHA256, SHA512, and the like), or may be a simple conversion that is otherwise defined, for example, inverting bits one by one. For whichever algorithm, a final result needs to ensure that the multicast-indicative characteristic bit value can indicate the address value is a multicast address, and the address value is not a broadcast address (FF-FF-FF-FF-FF-FF). Herein, the group identity indication information may be indication information that is carried in the message body to indicate which predetermined rule is used, or may be indication information used to trigger a predetermined rule. The indication information used to trigger a predetermined rule may be one bit in the message body, or may be frame type indication information in the message header indicating that a particular type of frames triggers the predetermined rule. The foregoing predetermined rule may be preset locally in a device by using a communications protocol, so that the requesting device 500 and the responding device can convert the source address into the group identity according to the preset predetermined rule. Optionally, as another embodiment, the first query response message received by the receiving unit 502 is used to indicate to the requesting device 500 that the responding device meets the query condition, and to trigger the requesting device 500 to send, by using the second sending unit 503, the second query request message.

Optionally, as another embodiment, the second query request message sent by the second sending unit 503 includes: a message header that carries the group identity and the address of the requesting device 500; and a message body that carries a second query condition, where the second query condition is different from the first query condition.

In other words, the message header of the second query request message directly carries the group identity, namely, the multicast address. After receiving the second query request message, a device on the network only needs to parse the message header to determine whether the message is sent to the device, namely, to determine whether the device belongs to a group with the group identifier by checking whether a group identity the same as the group identity in the message header is stored locally. If the device belongs to the group, the device continues to parse content of the message body; or, if the device does not belong to the group, the device need not continue to accept and parse the message.

It should be noted that, one first query request message may be followed by multiple second query request messages. The second query condition may be different from the first query condition, may be a further specific query condition compared with the first query condition, and may also be a query for detailed information.

Optionally, as another embodiment, the first query request message further includes delete indication information used to instruct the responding device and the requesting device 500 to delete the group identity.

In this embodiment of the present invention, a responding device that meets a query condition obtains and records a group identity according to a first query request message sent by a requesting device 500, so that the responding device can selectively receive and parse second query request messages, which can thereby reduce a waste of resources in the information query process, and decrease power consumption. In addition, compared with the practice of sending the second query request message in a unicast manner, this embodiment of the present invention exhibits time saving and higher efficiency.

Figure 6:
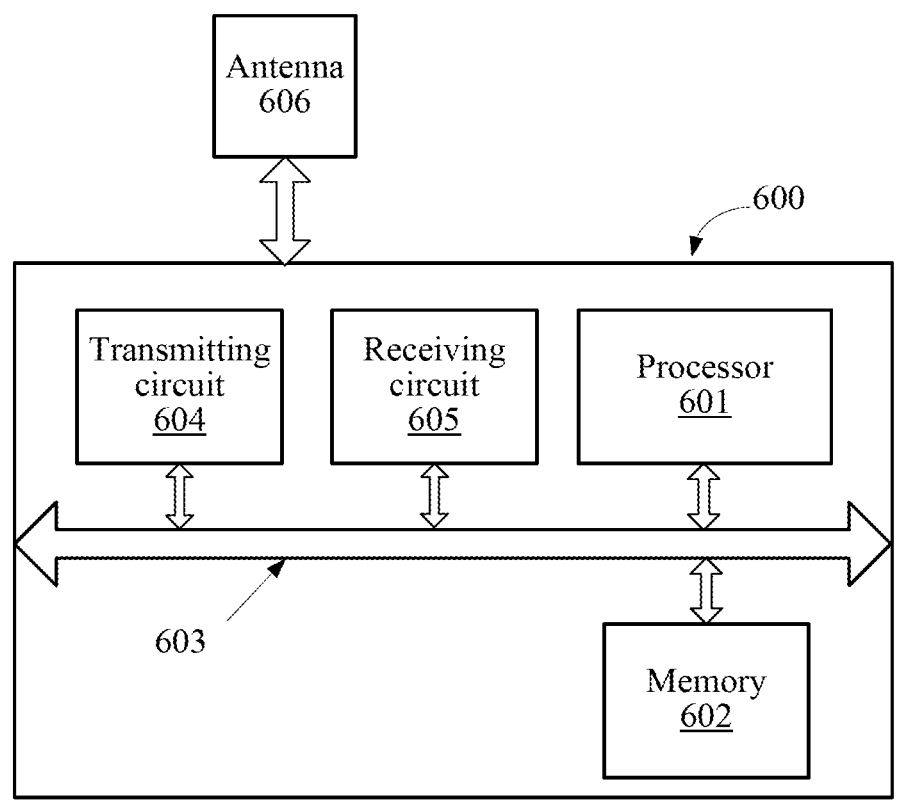
FIG. 6 is a schematic block diagram of a responding device according to another embodiment of the present invention.

FIG. 6 is a schematic block diagram of a responding device according to another embodiment of the present invention. The responding device 600 in FIG. 6 includes a processor 601, a memory 602, and a receiving circuit 605. The processor 601, the memory 602, and the receiving circuit 605 are coupled with each other by using a bus system 603.

The receiving circuit 605 is configured to receive a first query request message sent in a broadcast manner by a requesting device, where the first query request message carries a first query condition and information about a group identity. The processor 601 is configured to: when the responding device meets the first query condition, obtain and record the group identity according to the first query request message received by the receiving circuit 605. The receiving circuit 605 is further configured to receive a second query request message that uses the group identity as a receiving address and is sent by the requesting device; and the processor 601 is further configured to: when the receiving address of the second query request message is the group identity, parse content of the second query request message.

In addition, the responding device 600 may further include a transmitting circuit 604, an antenna 606, and the like. The processor 601 controls an operation of the responding device 600, and the processor 601 specifically may be a CPU (Central Processing Unit, central processing unit). The memory 602 may include a read-only memory and a random access memory, and provide an instruction and data for the processor 601. A part of the memory 602 may further include a non-volatile random access memory (NVRAM). Components of the responding device 600 are coupled together by using the bus system 603, where besides including a data bus, the bus system 603 may further include a power bus, a control bus, a status signal bus, and the like. However, for ease of description, various buses are all marked as the bus system 603 in the figure.

The method disclosed in the foregoing embodiment of the present invention may be applied to the processor 601, or may be implemented by the processor 601. The processor 601 may be an integrated circuit chip and exhibit signal processing capabilities. In an implementation, the steps of the method may be implemented by an integrated logical circuit of hardware in the processor 601, or by a software instruction. The processor 601 may be a general-purpose processor, a digital signal processor (DSP), an application-specific integrated circuit (ASIC), a field programmable gate array (FPGA) or another programmable logical component, a discrete gate or transistor logic, a discrete hardware component. The processor may implement or execute method, steps and logical block diagrams disclosed in the embodiments of the present invention. The general purpose processor may be a microprocessor, or the processor may also be any conventional processor or the like. Steps of the methods disclosed with reference to the embodiments of the present invention may be directly executed and accomplished by means of a hardware decoding processor, or may be executed and accomplished by using a combination of hardware and software modules in the decoding processor. The software module may be located in a mature storage medium in the field, such as a random access memory, a flash memory, a read-only memory, a programmable read-only memory, an electrically-erasable programmable memory or a register. The storage medium is located in the memory 602, and the processor 601 reads information in the memory 602, and in combination with hardware of the processor 601, completes the steps of the foregoing method.

Optionally, as an embodiment, the processor 601 is specifically configured to: directly obtain the group identity from the first query request message received by the receiving circuit 605 and record the group identity in the memory 602.

Optionally, as another embodiment, the processor 601 is further specifically configured to: obtain the group identity according to a predetermined rule indicated by group identity indication information and record the group identity in the memory 602.

Optionally, as another embodiment, the processor 601 is specifically configured to: modify a unicast-indicative characteristic bit value of an address of the requesting device to a multicast-indicative characteristic bit value, to obtain the group identity; or perform a hash operation according to the address of the requesting device, to obtain the group identity.

Optionally, as another embodiment, the second query request message received by the receiving circuit 605 includes: a message header that carries the group identity and the address of the requesting device; and a message body that carries a second query condition, where the second query condition is different from the first query condition.

Optionally, as another embodiment, the first query request message received by the receiving circuit 605 further includes delete indication information used to instruct the responding device and the requesting device to delete the group identity, so that the processor 601 deletes the group identity recorded in the memory 602 according to the instruction of the delete indication information.

Figure 7:
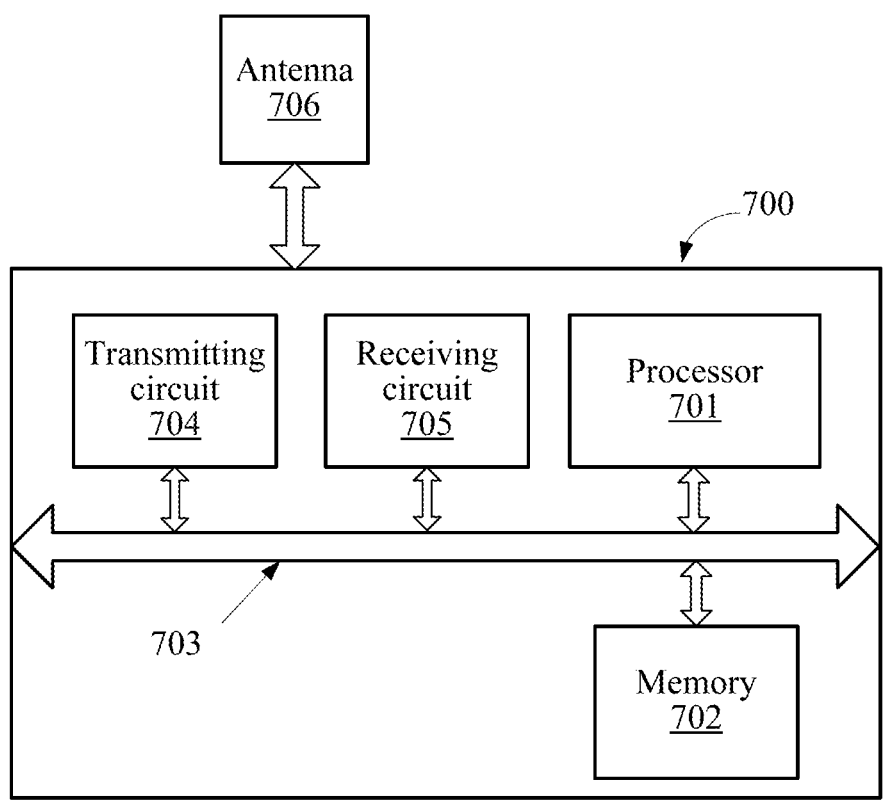
FIG. 7 is a schematic block diagram of a requesting device according to another embodiment of the present invention.

FIG. 7 is a schematic block diagram of a requesting device according to another embodiment of the present invention. A responding device 700 in FIG. 7 includes a processor 701, a memory 702, a transmitting circuit 704, and a receiving circuit 705. The processor 701, the memory 702, the transmitting circuit 704, and the receiving circuit 705 are coupled by using a bus system 703.

The transmitting circuit 704 is configured to send a first query request message in a broadcast manner, where the first query request message carries a first query condition and information about a group identity. The receiving circuit 705 is configured to receive a first query response message sent by a responding device that meets the first query condition. The processor 701 is configured to: when the receiving circuit 705 receives the first query response message, control the transmitting circuit 704 to send a second query request message that uses the group identity as a receiving address.

In addition, the responding device 700 may further include an antenna 707, and the like. The processor 701 controls an operation of the responding device 700, and the processor 701 may also be referred to as a CPU (Central Processing Unit, central processing unit). The memory 702 may include a read-only memory and a random access memory, and provide an instruction and data for the processor 701. A part of the memory 702 may further include a non-volatile random access memory (NVRAM). Components of the responding device 700 are coupled together by using the bus system 703, where besides including a data bus, the bus system 703 may further include a power bus, a control bus, a status signal bus, and the like. However, for ease of description, various buses are all marked as the bus system 703 in the figure.

The method disclosed in the foregoing embodiment of the present invention may be applied to the processor 701, or may be implemented by the processor 701. The processor 701 may be an integrated circuit chip and exhibits signal processing capabilities. In an implementation, the steps of the method may be implemented by an integrated logical circuit of hardware in the processor 701, or by a software instruction. The processor 701 may be a general-purpose processor, a digital signal processor (DSP), an application-specific integrated circuit (ASIC), a field programmable gate array (FPGA) or another programmable logical component, a discrete gate or transistor logic, a discrete hardware component. The processor may implement or execute method, steps and logical block diagrams disclosed in the embodiments of the present invention. The general purpose processor may be a microprocessor, or the processor may also be any conventional processor or the like. Steps of the methods disclosed with reference to the embodiments of the present invention may be directly executed and accomplished by means of a hardware decoding processor, or may be executed and accomplished by using a combination of hardware and software modules in the decoding processor. The software module may be located in a mature storage medium in the field, such as a random access memory, a flash memory, a read-only memory, a programmable read-only memory, an electrically-erasable programmable memory or a register. The storage medium is located in the memory 702, and the processor 701 reads information in the memory 702, and in combination with hardware of the processor 701, completes the steps of the foregoing method.

Optionally, as an embodiment, the information about the group identity includes the group identity, so that the responding device directly obtains the group identity from the first query request message sent by the transmitting circuit and records the group identity.

Optionally, as another embodiment, the information about the group identity includes group identity indication information, so that the group responding device obtains the group identity according to a predetermined rule indicated by the identity indication information and records the group identity.

Optionally, as another embodiment, the first query request message sent by the transmitting circuit 704 further includes an address of the requesting device, and the predetermined rule includes modifying a unicast-indicative characteristic bit value of the address of the requesting device to a multicast-indicative characteristic bit value, to obtain the group identity; or performing a hash operation according to the address of the requesting device, to obtain the group identity.

Optionally, as another embodiment, the second query request message sent by the transmitting circuit 704 includes: a message header that carries the group identity and the address of the requesting device; and a message body that carries a second query condition, where the second query condition is different from the first query condition.

Optionally, as another embodiment, the first query request message sent by the transmitting circuit 704 further includes delete indication information used to instruct the responding device and the requesting device to delete the group identity, so that the processor 701 deletes the group identity recorded in the memory 702 according to the instruction of the delete indication information.

Specifically speaking, the foregoing requesting device or responding device may be a mobile phone, a tablet, a PDA (Personal Digital Assistant, personal digital assistant), a POS (Point of Sales, point of sales), an in-vehicle computer, or the like, and may also be a printer, a copier, a scanner, a digital camera, a digital video camera, a rapid prototyping (Rapid Prototyping) machine, or the like that possesses network connection capability.

Figure 8:
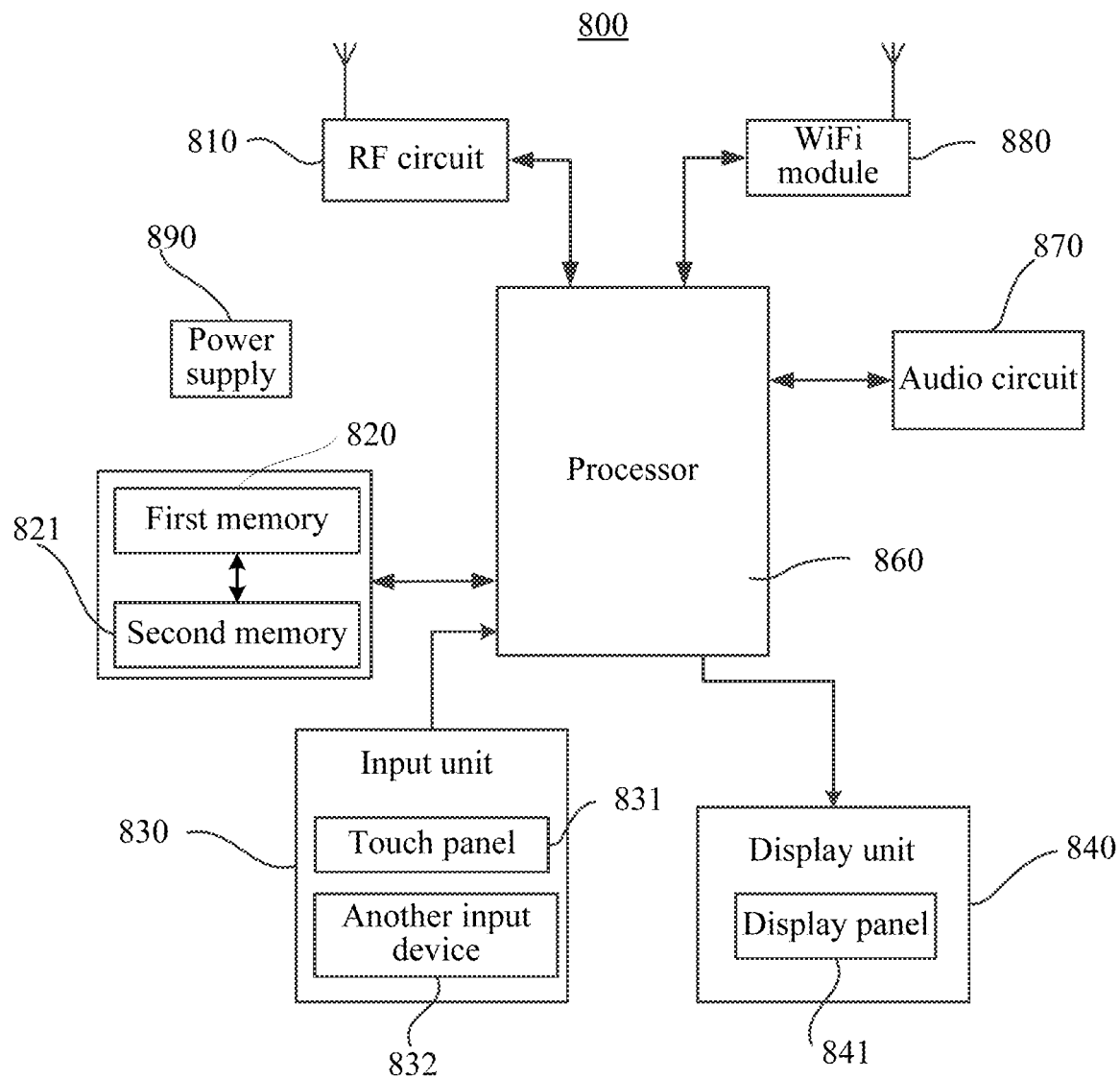
FIG. 8 is a schematic structural diagram of a specific instance of a requesting device or a responding device according to an embodiment of the present invention.

As a specific example, FIG. 8 shows a schematic structural diagram of a requesting device or responding device 800 according to an embodiment of the present invention. It should be understood that, this is merely an example, and does not constitute any limit on the present invention.

Referring to FIG. 8, the requesting device or responding device 800 in this embodiment of the present invention includes a first memory 820, a processor 860, and an input unit 830, where the first memory 820 stores a preset quantity of application program interface information of the requesting device or the responding device, where the interface information includes an interface element, an interface number, a correspondence between the interface number and the interface element, and location information about the interface element located on an application program interface corresponding to the interface number; the input unit 830 is configured to receive a user operation of switching an application program interface, and generate a switching signal; and the processor 860 is configured to determine a target interface number according to the switching signal; determine, according to a predetermined quantity adjacent to the target interface number, interface numbers adjacent to the target interface number; determine interface information corresponding to a to-be-loaded interface number according to the interface numbers stored in the first memory 820 and the interface numbers adjacent to the target interface number; release storage space that is in the first memory 820 and occupied by interface information of at least some of interface numbers that are not adjacent to the target interface number; and load the interface information corresponding to the to-be-loaded interface number into the first memory 820.

The preset quantity refers to a quantity of interface information, which can be stored in the first memory, of application programs. The predetermined quantity refers to a quantity of interface numbers adjacent to each side of the target interface number.

The processor 860 may load interface information corresponding to the interface numbers adjacent to the target interface number into the first the memory 820 by releasing the storage space, in the first memory 820, occupied by the interface information of at least some of interface numbers that are not adjacent to the target interface number.

In this way, the processor 860 can load interface information continuously, thereby alleviating the conflict between a limited storage capacity of the requesting device or responding device 800 and an increasing quantity of application program interfaces.

The practice of determining interface information corresponding to a to-be-loaded interface number according to the interface numbers stored in the first the memory 820 and the interface numbers adjacent to the target interface number is specifically: determining, according to the interface numbers stored in the first the memory 820 and the interface numbers adjacent to the target interface number, an interface number that is not stored in the first the memory 820, where interface information corresponding to the interface number that is not stored is the interface information corresponding to the to-be-loaded interface number of the first memory 820.

It should be noted that, the processor 860 may invoke an interface element that is corresponding to the target interface number and stored in the first the memory 820, and location information about the interface element displayed on an application program interface corresponding to the interface number, thereby displaying the interface element on the application program interface corresponding to the interface number. The interface element may be an application program icon, a widget, or the like.

In this embodiment of the present invention, the requesting device or responding device 800 may further include a second memory 821, where the second memory 821 may be configured to store interface information of all application programs of the requesting device or responding device 800. The practice of loading the interface information corresponding to the to-be-loaded interface number into the first memory 820 by the processor 860 is specifically: the processor 860 invokes the interface information, which is in the second memory 821, corresponding to the to-be-loaded interface number, and loads the interface information corresponding to the to-be-loaded interface number into the first memory 820.

It can be understood that, the second memory 821 may be an external memory of the requesting device or responding device 800, and the first memory 820 may be an internal memory of the requesting device or responding device 800. The processor 860 may load a preset quantity of interface information from the second memory 821 into the first memory 820. Each loaded interface information corresponds to a storage space in the first memory 820, and optionally, each storage space may be the same. The first memory 820 may be one of an NVRAM non-volatile memory, a DRAM dynamic random access memory, an SRAM static random access memory, a flash memory, or the like; the second memory 821 may be a hard disk, an optical disc, a USB disk, a floppy disk, a tape drive, or the like.

In this embodiment of the present invention, all interface information of the requesting device or the responding device may be stored in a cloud server, where the cloud server may be the second memory 821. The practice of loading the interface information corresponding to the to-be-loaded interface number into the first memory 820 by the processor 860 is specifically: the processor 860 obtains, from the cloud server by using a network channel, the interface information corresponding to the to-be-loaded interface number, and loads the interface information corresponding to the to-be-loaded interface number into the first memory 820.

The input unit 830 may be configured to receive numerical information or character information that is input, and generate signal input related to a user setting and function control of the requesting device or responding device 800. Specifically, in this embodiment of the present invention, the input unit 830 may include a touch panel 831. The touch panel 831, also referred to as a touchscreen, may collect a touch operation performed by a user on the touch panel or near the touch panel (for example, the operation performed on the touch panel 831 or near the touch panel 831 by the user with a finger, a stylus, or any suitable object or accessory), and drive a corresponding connected device according to a preset program. Optionally, the touch panel 831 may include two parts, namely, a touch detection device and a touch controller. The touch detection device detects a direction of a user touch, detects a signal caused by the touch operation, and transmits the signal to the touch controller; and the touch controller receives touch information from the touch detection device, converts the touch information to coordinates of the touch point, sends the coordinates of the touch point to the processor 860, and receives and executes a command sent by the processor 860. In addition, the touch panel 831 can be of a resistive type, a capacitive type, an infrared type, a surface acoustic wave type, and the like. Besides the touch panel 831, the input unit 830 may further include another input device 832, where the another input device 832 may include but is not limited to one or more of a physical keyboard, a function key (for example, a volume control key and an on/off key), a track ball, a mouse, a joystick, and the like.

The requesting device or responding device 800 may further include a display unit 840, where the display unit 840 may be used to display information input by a user or information provided for the user or various menu interfaces of the requesting device or responding device 800. The display unit 840 may include a display panel 841, and optionally, the display panel 841 may be configured in a form of an LCD (Liquid Crystal Display, liquid crystal display), an OLED (Organic Light-Emitting Diode, organic light-emitting diode), or the like.

The processor 860 is a control center of the requesting device or responding device 800, connects various parts of the entire device by using various interfaces and lines, and performs various functions of the requesting device or responding device 800 and processes data by running or executing a software program and/or a module stored in the first memory 820 and invoking data stored in the second memory 821, thereby performing overall monitoring on the requesting device or responding device 800. Optionally, the processor 160 may include one or more processing units.

It can be understood that, during initialization, the processor 860 may load a preset quantity of interface information from the interface information stored in the second memory 821 into the first memory 820, and records interface numbers corresponding to the preset quantity of interface information. The processor 860 reads from the first memory 820 any interface information or interface information with a predetermined number, and generates an interface according to the interface information; controls, an application program interface display area 843 of the touch display screen 842 to display the generated interface as an initial interface, and controls the common controller display area 844 to display interface numbers and provide a user selection interface, where the interface numbers displayed on the common controller display area 844 may be interface numbers corresponding to the interface information loaded into the first memory 820, or may be interface numbers corresponding to the interface information stored in the second memory 821. The preset quantity is not greater than a maximum quantity of interface information that can be stored in the first memory 820.

Optionally or further, the processor 860 may control at least some interface numbers among the interface numbers displayed on the common controller display area 844 to respond to a user input operation.

For example, among the interface numbers displayed on the common controller display area 844, the processor 860 controls an interface number corresponding to the loaded interface information to respond to a user input operation, and controls an interface number corresponding to unloaded interface information not to respond to a user input operation.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

Methods or steps described in the embodiments disclosed in this specification may be implemented by hardware, a software program executed by a processor, or a combination thereof. The software program may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The present invention is described in detail with reference to the accompany drawings and in combination with the exemplary embodiments, but the present invention is not limited thereto. Various equivalent modifications or replacements can be made to the embodiments of the present invention by a person of ordinary skill in the art without departing from the spirit and essence of the present invention, and the modifications or replacements shall fall within the scope of the present invention.

What is claimed is:

1. An information query method comprising:
  receiving, by a responding device, a first query request message sent in a broadcast manner by a requesting device, wherein the first query request message carries a first query condition and information about a group identity;
  when the responding device meets the first query condition, obtaining and recording, by the responding device, the group identity according to the first query request message, and sending a first query response message to the requesting device; and
  receiving, by the responding device, a second query request message sent by the requesting device, and when a receiving address of the second query request message is the group identity, parsing content of the second query request message, so as to process the second query request message;
  wherein the information about the group identity comprises the group identity, and the obtaining and recording, by the responding device, the group identity according to the first query request message comprises:
directly obtaining, by the responding device, the group identity from the first query request message and recording the group identity; and wherein the information about the group identity comprises group identity indication information, the group identity indication information is used to indicate a predetermined rule used for obtaining the group identity, and the obtaining and recording, by the responding device, the group identity according to the first query request message comprises obtaining, by the responding device, the group identity according to the predetermined rule and recording the group identity.

2. The method according to claim 1, wherein the first query request message further comprises an address of the requesting device, and the obtaining, by the responding device, the group identity according to the predetermined rule and recording the group identity comprises:
modifying a unicast-indicative characteristic bit value of the address of the requesting device to a multicast-indicative characteristic bit value, to obtain the group identity; or
performing a hash operation according to the address of the requesting device, to obtain the group identity.

3. The method according to claim 1, wherein the first query response message is used to indicate to the requesting device that the responding device meets the first query condition.

4. The method according to claim 1, wherein the second query request message comprises:
a message header that carries the group identity and the address of the requesting device; and
a message body that carries a second query condition, wherein the second query condition is different from the first query condition.

5. The method according to claim 1, wherein the first query request message further comprises delete indication information used to instruct the responding device and the requesting device to delete the group identity.

6. An electronic device comprising:
a transmitter configured to send a first query request message in a broadcast manner, wherein the first query request message carries a first query condition and information about a group identity;
a receiver configured to receive a first query response message sent by a responding device that meets the first query condition;
a processor; and
a memory storing a program to be executed in the processor, the program comprising instructions for controlling the transmitter to send a second query request message that uses the group identity as a receiving address when the receiver receives the first query response message;
wherein the information about the group identity comprises the group identity, so that the responding device directly obtains the group identity from the first query request message sent by the transmitter and records the group identity;
wherein the information about the group identity comprises group identity indication information, so that the responding device obtains the group identity according to a predetermined rule indicated by the group identity indication information and records the group identity; and wherein the first query request message further comprises an address of a requesting device, and the predetermined rule comprises:
modifying a unicast-indicative characteristic bit value of the address of the requesting device to a multicast-indicative characteristic bit value, to obtain the group identity; or
performing a hash operation according to the address of the requesting device, to obtain the group identity.

7. The device according to claim 6, wherein the second query request message comprises:
a message header that carries the group identity and the address of the requesting device; and
a message body that carries a second query condition, wherein the second query condition is different from the first query condition.

8. The device according to claim 6, wherein the first query request message further comprises delete indication information used to instruct the responding device and a requesting device to delete the group identity.

9. A service device comprising:
a receiver configured to receive a first query request message sent in a broadcast manner by a requesting device, wherein the first query request message carries a first query condition and information about a group identity;
a processor; and
a memory storing a program to be executed in the processor, the program comprising instructions for obtaining and recording the group identity according to the first query request message when a responding device meets the first query condition, wherein the receiver is further configured to receive a second query request message that is sent by the requesting device and uses the group identity as a receiving address; and wherein the program includes further instructions for parsing content of the second query request message when the receiving address of the second query request message is the group identity;
wherein the information about the group identity comprises the group identity, and program includes further instructions for directly obtaining the group identity from the first query request message and record the group identity in the memory when the responding device meets the first query condition;
wherein the information about the group identity comprises group identity indication information, and the program includes further instructions for obtaining the group identity according to a predetermined rule indicated by the group identity indication information and record the group identity into the memory; and
wherein the first query request message further comprises an address of the requesting device, and the program includes further instructions for:
modifying a unicast-indicative characteristic bit value of the address of the requesting device to a multicast-indicative characteristic bit value, to obtain the group identity; or
performing a hash operation according to the address of the requesting device, to obtain the group identity.

10. The device according to claim 9, wherein the second query request message comprises:
a message header that carries the group identity and the address of the requesting device; and
a message body that carries a second query condition, wherein the second query condition is different from the first query condition.

11. The device according to claim 9, wherein the first query request message further comprises delete indication information used to instruct the responding device and the requesting device to delete the group identity.

12. The device according to claim 9, further comprising:
a transmitter configured to send a first query response message to the requesting device, wherein the first query response message is used to indicate to the requesting device that the service device meets the first query condition.

* * * * *